United States Patent
Nguyen et al.

(10) Patent No.: US 10,976,458 B2
(45) Date of Patent: Apr. 13, 2021

(54) OPTIMIZATION OF GEOPHYSICAL WORKFLOW PERFORMANCE USING ON-DEMAND PRE-FETCHING FOR LARGE SEISMIC DATASETS

(71) Applicant: Landmark Graphics Corporation, Houston, TX (US)

(72) Inventors: Nam Xuan Nguyen, Katy, TX (US); Xuewei Tan, Sugar Land, TX (US); Mengdong Guo Liu, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 199 days.

(21) Appl. No.: 15/777,043

(22) PCT Filed: Feb. 1, 2016

(86) PCT No.: PCT/US2016/015910
§ 371 (c)(1),
(2) Date: May 17, 2018

(87) PCT Pub. No.: WO2017/135920
PCT Pub. Date: Aug. 10, 2017

(65) Prior Publication Data
US 2018/0348391 A1 Dec. 6, 2018

(51) Int. Cl.
*G01V 1/30* (2006.01)
*G01V 1/34* (2006.01)

(52) U.S. Cl.
CPC ............... *G01V 1/307* (2013.01); *G01V 1/30* (2013.01); *G01V 1/345* (2013.01); *G01V 2210/624* (2013.01); *G01V 2210/66* (2013.01)

(58) Field of Classification Search
CPC ... G01V 1/28; G01V 1/30; G01V 1/32; G01V 1/282; G01V 1/301; G01V 1/302;
(Continued)

(56) References Cited

U.S. PATENT DOCUMENTS 4,397,007 A * 8/1983 Goode ............... G01V 1/34
367/68
4,969,130 A * 11/1990 Wason ............... E21B 49/00
367/37
(Continued)

FOREIGN PATENT DOCUMENTS

WO WO-2004034090 A1 * 4/2004 ............ G01V 1/288
WO WO 2014/209375 A1 12/2014

OTHER PUBLICATIONS

Brown, "What is Seismic Interpretation?" (http://library.seg.org/doi/pdf/10.1190/1.9781560802884.fm).
(Continued)

*Primary Examiner* — John E Breene
*Assistant Examiner* — Jeffrey P Aiello
(74) *Attorney, Agent, or Firm* — Haynes and Boone, LLP (57) ABSTRACT

A system to provide on-demand fetching of sequential sets of seismic data to local memory from slower storage mediums prior to performing computing operations, such as horizon auto-tracking, amplitude extraction and seismic attribute generation. As a result, the performance of the storage infrastructure (e.g., hard drives, storage filer "file server" over network, etc.) is maximized and the local memory/cache speed is fully utilized to deliver optimal system performance even when working with large seismic datasets that exceed the storage capacity of the local memory.

20 Claims, 7 Drawing Sheets

(58) Field of Classification Search
CPC ........ G01V 1/303; G01V 1/307; G01V 1/345;
G01V 2210/64; G01V 99/005; G06T
15/00; G06T 17/05; E21B 49/00; E21B
41/0092
USPC ........... 166/250.01; 175/50; 345/419; 367/7,
367/25; 702/11, 13–14, 16–18; 703/6,
703/10
See application file for complete search history.

(56) References Cited

U.S. PATENT DOCUMENTS

| | | | | |
|---|---|---|---|---|
| 6,694,427 | B1* | 2/2004 | Mericas | G06F 9/3802 |
| | | | | 712/227 |
| 6,889,888 | B2* | 5/2005 | Dupuis | B23K 31/02 |
| | | | | 228/103 |
| 9,607,007 | B2* | 3/2017 | Bakke | G01V 11/00 |
| 9,829,591 | B1* | 11/2017 | Yu | G01V 1/301 |
| 2002/0191490 | A1* | 12/2002 | Meunier | G01V 1/005 |
| | | | | 367/140 |
| 2004/0032795 | A1* | 2/2004 | Baroni | B06B 1/0618 |
| | | | | 367/37 |
| 2005/0010367 | A1 | 1/2005 | Diller | |
| 2006/0034153 | A1* | 2/2006 | Meunier | G01V 1/288 |
| | | | | 367/57 |
| 2006/0104158 | A1* | 5/2006 | Walls | G01V 1/30 |
| | | | | 367/73 |
| 2008/0109169 | A1* | 5/2008 | Thumrugoti | G01V 1/288 |
| | | | | 702/16 |
| 2008/0161942 | A1* | 7/2008 | Gunnarshaug | E21B 41/00 |
| | | | | 700/35 |
| 2010/0149917 | A1* | 6/2010 | Imhof | G01V 1/302 |
| | | | | 367/53 |
| 2011/0074766 | A1* | 3/2011 | Page | G06T 17/05 |
| | | | | 345/419 |
| 2011/0115787 | A1 | 5/2011 | Kadlec | |
| 2013/0345985 | A1* | 12/2013 | Priezzhev | G01V 1/32 |
| | | | | 702/14 |
| 2014/0222347 | A1* | 8/2014 | Bashore | G01V 1/282 |
| | | | | 702/16 |
| 2016/0370484 | A1* | 12/2016 | Cotton | G01V 1/308 |

OTHER PUBLICATIONS

Chopra, "Interpretation of Three-Dimensional Seismic Data", http://www.aapg.org/publications/news/explorer/column/articleid/2471/what-is-seismic-interpretation.
Herron, "Seismic Horizon Auto-Picking" (http://library.seg.org/doi/abs/10.1190/1.1438636).
International Search Report and the Written Opinion of the International Search Authority, or the Declaration, dated Nov. 1, 2016, PCT/US2016/015910, 13 pages, ISA/KR.

* cited by examiner

OPTIMIZATION OF GEOPHYSICAL WORKFLOW PERFORMANCE USING ON-DEMAND PRE-FETCHING FOR LARGE SEISMIC DATASETS

PRIORITY

The present application is a U.S. National Stage patent application of International Patent Application No. PCT/US2016/015910, filed on Feb. 1, 2016, the benefit of which is claimed and the disclosure of which is incorporated herein by reference in its entirety.

FIELD OF THE DISCLOSURE

The present disclosure relates generally to hydrocarbon reservoir modeling and seismic interpretation and, more specifically, to a system that pre-fetches seismic data from a slow storage medium and writes it to faster local memory before performing a computing operation on the seismic data.

BACKGROUND

In hydrocarbon exploration, accurately understanding the economic projections of a reservoir is vitally important. Conventional approaches to such analysis include the use of earth modeling systems that utilize seismic data to simulate subsurface geological structures, such as faults or other stratigraphic features. Seismic-data traces are the record of the reflection of sonic waves from underground. These traces can be denoted as A(x, y, t), the reflection amplitude of time t at surface location (x, y). Seismic interpretation results are comprised of volumes, horizons and faults, which are ultimately utilized to generate a model of the reservoir representative of the structure (stratigraphic layers, faults, etc.) of the formation.

The seismic volumes are three-dimensional volume datasets within a 3D seismic survey or two-dimensional datasets along 2D seismic lines. Horizons that are interpreted manually and automatically, also known as "auto-tracking", from the seismic volumes represent the stratigraphic layers along the reservoir model. During the interpretation workflow, additional seismic attributes volumes are generated from the input volumes to represent some measured or calculated seismic-petrophysical reservoir property. Furthermore, an amplitude extraction operation could be performed to extract additional attributes horizon from an input horizon and input volume to gain better understand of reservoir stratigraphic features. Information from different volume and horizon datasets are extracted to thereby analyze the desired subsurface geological structures.

Conventional earth modeling systems work with seismic data directly from a storage medium, such as, for example, a hard disk or network storage device. These storage mediums are used because they have very large storage capacities. However, the process of repeatedly retrieving seismic data trace-by-trace directly from the storage medium for the desired operations results in sub-optimal system performance. Moreover, conventional systems typically load the entire seismic dataset from the slower storage medium and into the faster local memory (e.g., random-access memory ("RAM")) before beginning further seismic computation or display. However, if the seismic dataset is larger than the available local memory, only a portion of the seismic data can be accommodated in memory. As a result, the interpreter will experience slowness in seismic computation operation, thus providing a much degraded system performance.

DESCRIPTION OF ILLUSTRATIVE EMBODIMENTS

Illustrative embodiments and related methods of the present disclosure are described below as they might be employed in a system which provides on-demand fetching of sequential sets of seismic data to local memory from slower storage mediums prior to performing the selected operations. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

Figure 1:
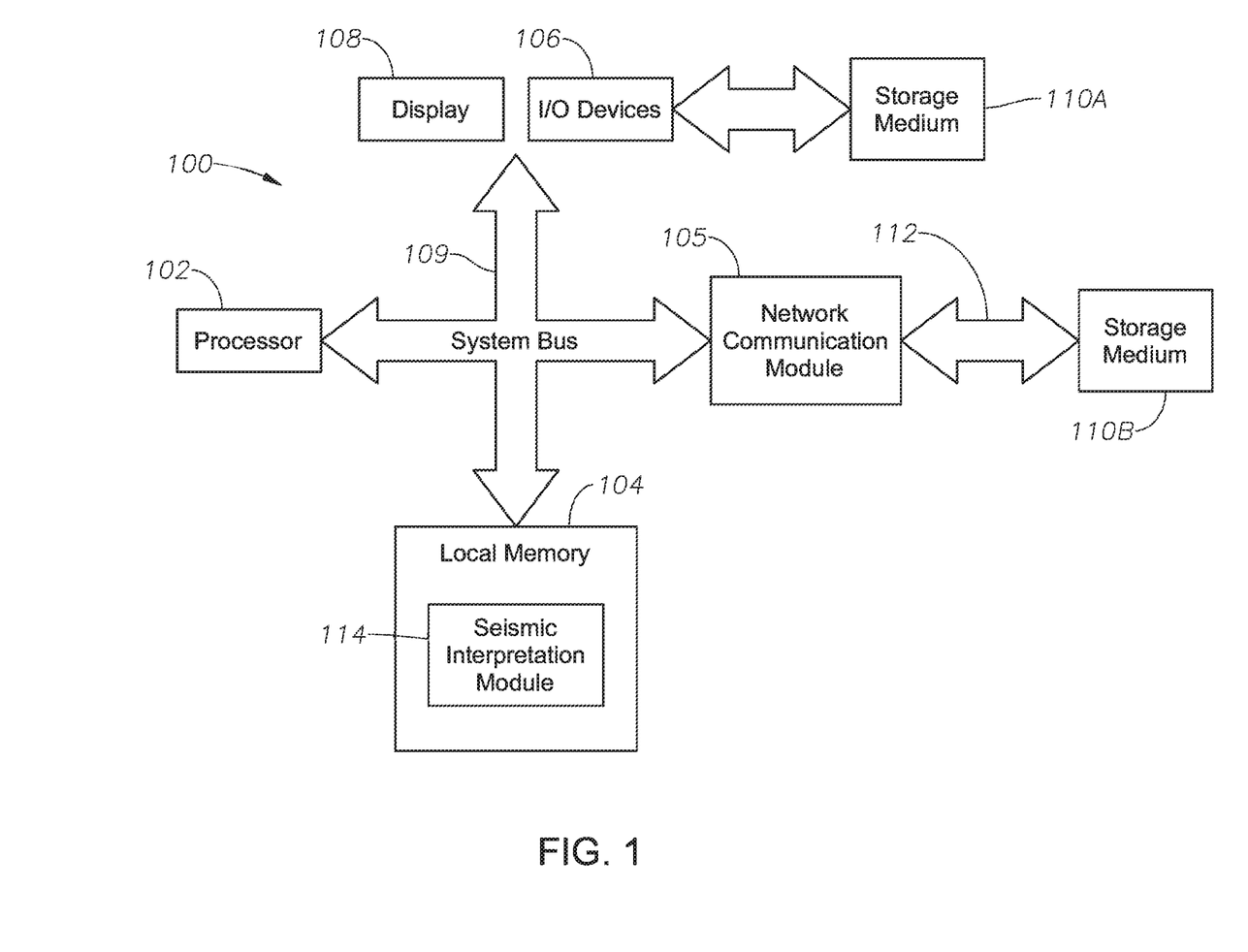
FIG. 1 is a block diagram of a seismic modeling system according to certain illustrative embodiments of the present disclosure.

FIG. 1 shows a block diagram of a seismic modeling system 100 according to certain illustrative embodiments of the present disclosure. As will be described herein, illustrative embodiments of the present disclosure pre-fetch a defined set of seismic volumes from a storage medium, and then write the fetched dataset to local memory before operations are performed on the data. As used herein, "storage medium" generally refers to large capacity media such as, for example, network storage devices, disk drives, filers, CD-RW, and DVD-RWs. The term "local memory," however, herein generally refers to faster memory such as, for example, local RAM or cache memory, or even some local external RAM storage devices. As will be understood by those ordinarily skilled in the art having the benefit of this disclosure, the time it takes for the processor to read/write from/to a storage medium far exceeds that of local memory.

By writing a defined set of seismic data from the storage medium to local memory before an operation is performed, the illustrative embodiments described herein maximize the performance of the storage medium and local memory to deliver an optimal system performance—even when working from a large seismic dataset which is 100s times greater than the local memory capacity. The described embodiments further enable on-demand writing of seismic data into local memory as part of the seismic interpretation and computation workflow. As a result, performance is fully optimized for the defined set of seismic data that the selected operation requires, and is completely independent of the dataset size.

In a generalized method, a seismic interpretation model of a hydrocarbon reservoir is first generated. The model includes seismic volume and horizon data form by a plurality of sonic traces. When performing a given operation, an input dataset is selected from the seismic volume and horizon data, from which a set of sequential traces are defined. The set of sequential traces are then fetched from the storage medium and written into local memory. Thereafter, the selected operation is performed on the set of sequential trace data in local memory. Moreover, before fetching more sets of sequential traces from the storage medium, the system determines if those traces have already been fetched. If the set has already been fetched, the system simply performs the defined operation on the data in memory; however, if the set has not been fetched, the system then fetches the data from the storage medium. As a result, the system maximizes performance by avoiding the sluggish process of repeatedly fetching data trace-by-trace from the storage medium, as in conventional systems. Furthermore, since the seismic data is always sequentially read, as a result, storage medium performance is maximized and even more time efficiencies are achieved. These and other advantages of the present disclosure will be apparent to those ordinarily skilled in the art having the benefit of this disclosure.

Referring to FIG. 1, illustrative seismic modeling system 100 includes at least one processor 102 (i.e., processing circuitry), a non-transitory, computer-readable memory 104 (i.e., local memory), transceiver/network communication module 105, optional I/O devices 106, and an optional display 108 (e.g., user interface), all interconnected via a system bus 109. Software instructions executable by the processor 102 for implementing the functions of the illustrative methods described herein may be stored in local memory 104. Local memory 104, also known as RAM or cache memory, for example, provides fast write/read capabilities.

Seismic modeling system 100 further includes storage medium 110A interconnected via I/O devices 106. Storage medium 110A is a high capacity storage medium designed for general storage, backup or archiving, such as, for example, ROM, hard disk drive, network storage device, CD-RW, or DVD-RW. Illustrative network storage devices include network attached storage ("NAS") filers, storage file servers or storage area network ("SAN") filers. In this example, storage medium 110A is located in or adjacent to seismic modeling system 100. In addition, a second remote storage medium 110B, similar to 110A, may also be communicably coupled to seismic modeling system 100 via a network connection 112 as shown. For example, storage medium 110B may be a network storage device.

Although not explicitly shown in FIG. 1, it will be recognized that seismic modeling system 100 may be connected to one or more public and/or private networks via one or more appropriate network connections. It will also be recognized that the software instructions to perform the functions of the present disclosure may also be loaded into local memory 104 from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to FIG. 1, in certain illustrative embodiments, seismic modeling system 100 includes seismic interpretation module 114. Storage medium 110A and/or 110B stores the seismic data locally or at a remote location. An illustrative storage platform is, for example, the DecisionSpace® software suite, commercially offered through Landmark Graphics Corporation of Houston Texas. Those ordinarily skilled in the art having the benefit of this disclosure realize there are a variety of software platforms and associated systems to retrieve, store and integrate the seismic and related data, as described herein.

Still referring to the illustrative embodiment of FIG. 1, seismic interpretation module 114 also integrates with seismic data to provide subsurface stratigraphic visualization including, for example, geoscience interpretation. Illustrative seismic interpretation platforms include, for example, DecisionSpace®, which is commercially available through the Assignee of the present disclosure, Landmark Graphics Corporation of Houston, Tex. However, those ordinarily skilled in the art having the benefit of this disclosure realize a variety of other seismic interpretation platforms may also be utilized with the present disclosure. Moreover, seismic interpretation module 114 may also include multi-domain workflow automation capabilities that may connect any variety of desired technical and modeling applications.

Figure 2A:
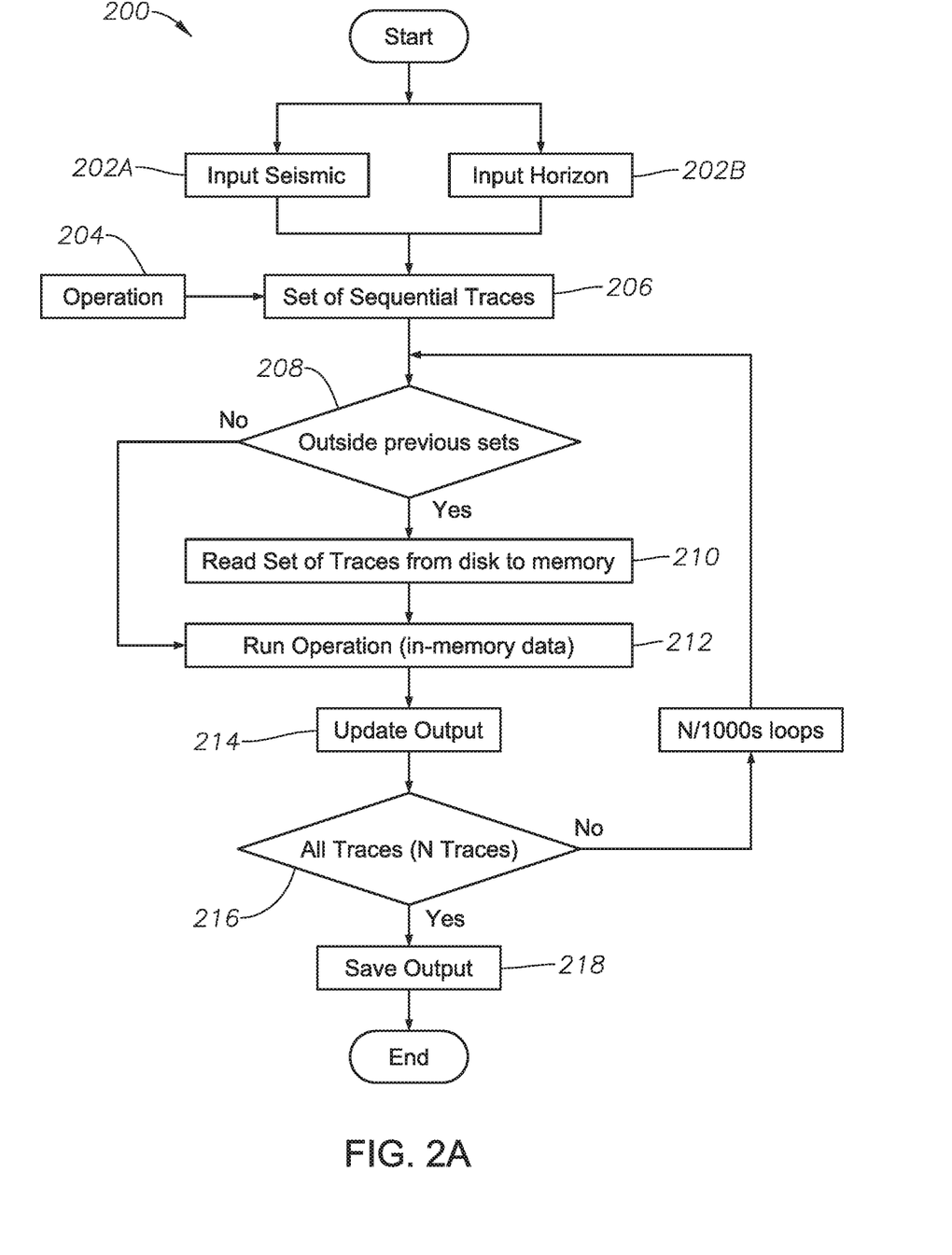
FIG. 2A is a flow chart of a method for analyzing seismic data, according to certain illustrative methods of the present disclosure.

Referring to FIG. 2A, an illustrative method 200 of the present disclosure utilized to analyze seismic data will now be described. At blocks 202A and 202B, via seismic interpretation module 114, processor 102 generates a seismic interpretation model which is comprised of seismic and horizons datasets that represent various seismic-petrophysical properties of the hydrocarbon reservoir. Examples of seismic data include amplitude, phase, frequency, and semblance data. Via a user interface, for example, an input seismic and horizon dataset (i.e., input dataset) is selected to thereby begin the desired operation (block 204) such as, for example, horizon manual interpretation, horizon auto-tracking, amplitude extraction, or seismic attribute volume generation.

Figure 2B:
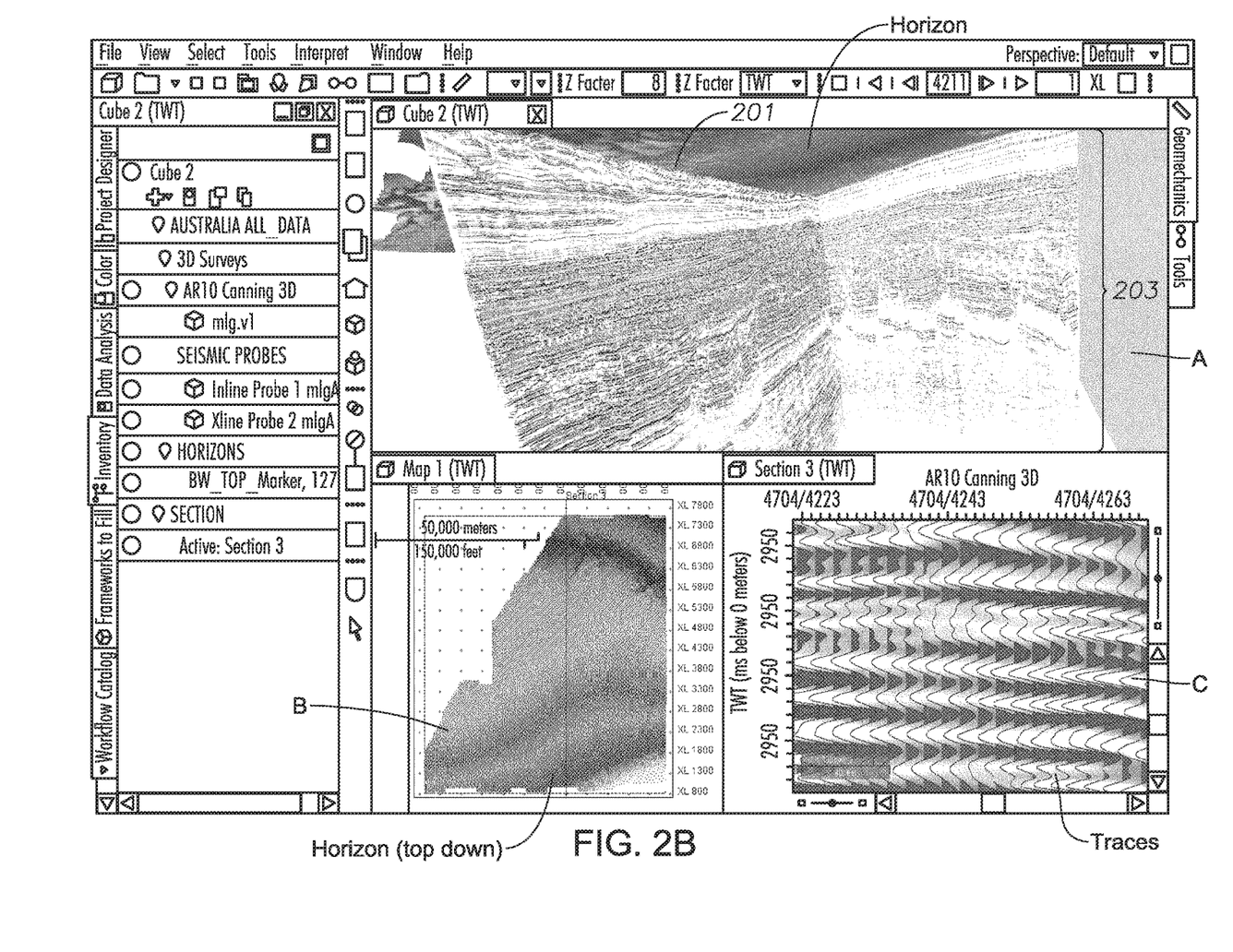
FIG. 2B is user interface displaying a seismic modeling data generated by seismic modeling system, according to certain illustrative embodiments of the present disclosure.

To illustrate this feature, FIG. 2B shows an illustrative user interface displaying a horizon generated by seismic modeling system 100. In Window A, a seismic volume dataset 201 has been selected at blocks 202A,B as an input dataset and is shown comprising a number of horizon datasets 203. Although shown in a cut-away fashion, volume dataset 201 may also be displayed as a two or three dimensional cube or brick, as will be understood by those ordinarily skilled in the art having the benefit of this disclosure. Window B illustrates a top-down view of a selected horizon dataset 203 from within volume dataset 201, and Window C illustrates sonic traces of the selected amplitude seismic dataset. The X and Y axes in Window B are in real world coordinates in a cartographic projection. The units may be in, for example, feet or meters. The X axis in Window C identifies the inline and/or crossline survey coordinates of the seismic traces being displayed. The Y axis in Window C is two-way travel time or depth.

Thus, at blocks 202A,B, the input dataset may be a variety of datasets within the reservoir model. For example, as mentioned above, the input dataset may be a two or three dimensional volume dataset (volume dataset 201 or a volume within volume dataset 201, for example) or an interpreted horizon dataset representing a stratigraphic layer in a volume dataset. The selection of the input dataset may be accomplished, for example, via the user interface whereby the user selects from a list of available datasets that have been loaded into the session.

Figure 2C:
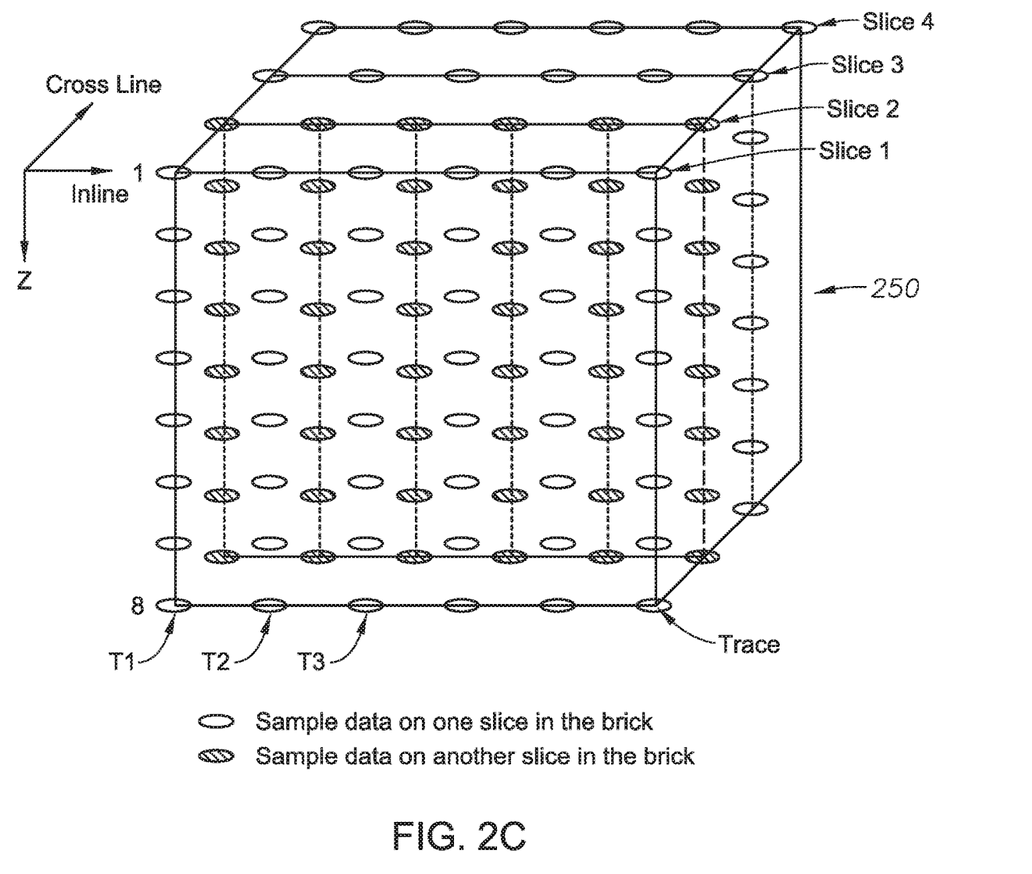
FIG. 2C illustrates a single 3-D brick dataset, which is useful to illustrate the sequential read/write feature of the present disclosure.
Figure 2D:
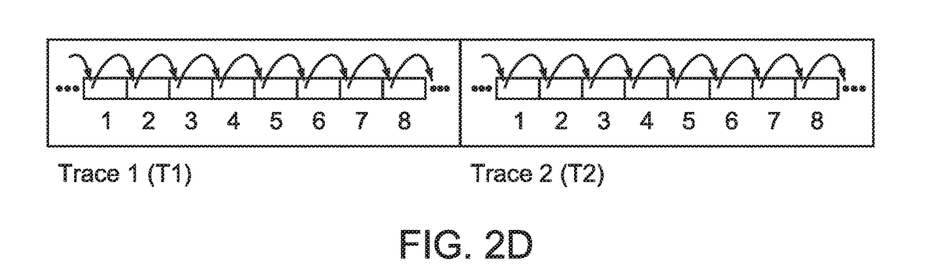
FIG. 2D depicts trace data being sequentially stored on a storage device, according to certain illustrative methods of the present disclosure.

At block 206, based upon the input dataset and the selected operation, seismic modeling system 100 then defines a set of many sequential seismic traces based on data access requirement of the operation, as shown in Window C, within the input dataset. The definition of the set of sequential seismic traces is an approach for reading data (i.e., fetching) in a sequential order on a storage device. FIG. 2C illustrates a single 3-D brick data set, which is useful to illustrate the sequencing of the present disclosure. Seismic data brick 250 includes a plurality of trace data having seismic data dispersed throughout. In one example, in order to read trace data in a sequential order, the system may first read trace data from storage medium 110A,B at positions 1-8 in sequential order in the Z-direction, then write the dataset into local memory 104 as shown in FIG. 2D, thus storing a first trace T1. Likewise, the adjacent trace in the inline direction may be read the same, thus representing a trace T2. This process may continue for all brick slices 1-4, until all trace data in the set has been read in a sequential fashion.

Figure 2E:
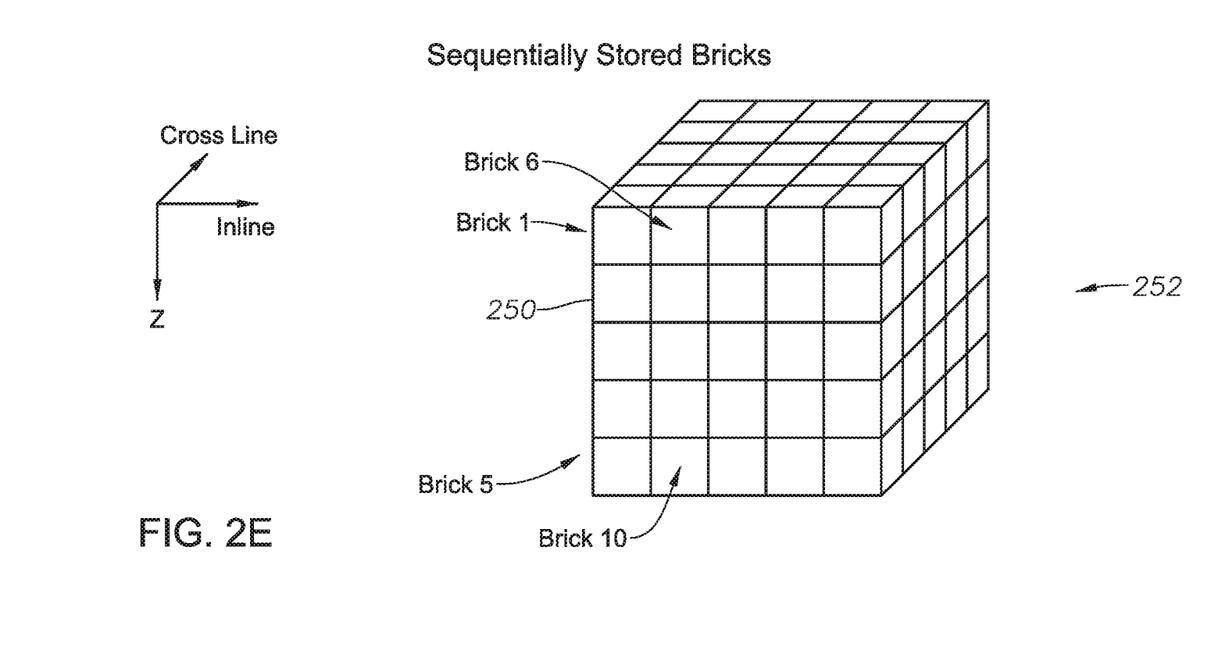
FIG. 2E shows a larger bricked dataset comprised of a plurality of brick datasets.
Figure 3A:
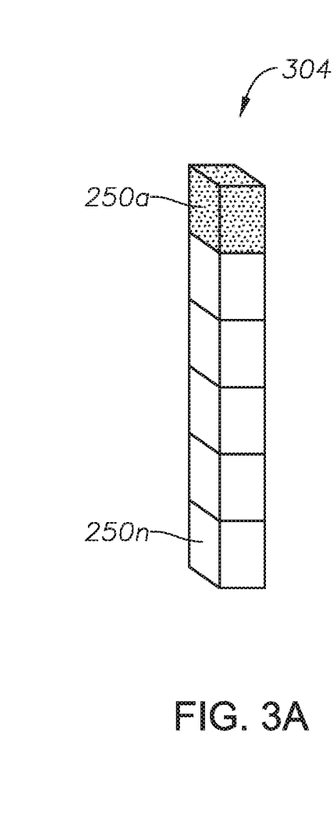
FIGS. 3A-3C illustrate a variety of ways in which the set of sequential traces may be defined from bricked dataset.
Figure 3B:
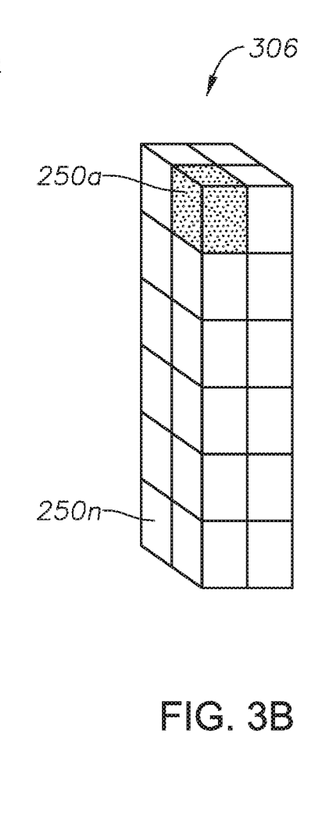
Figure 3C:
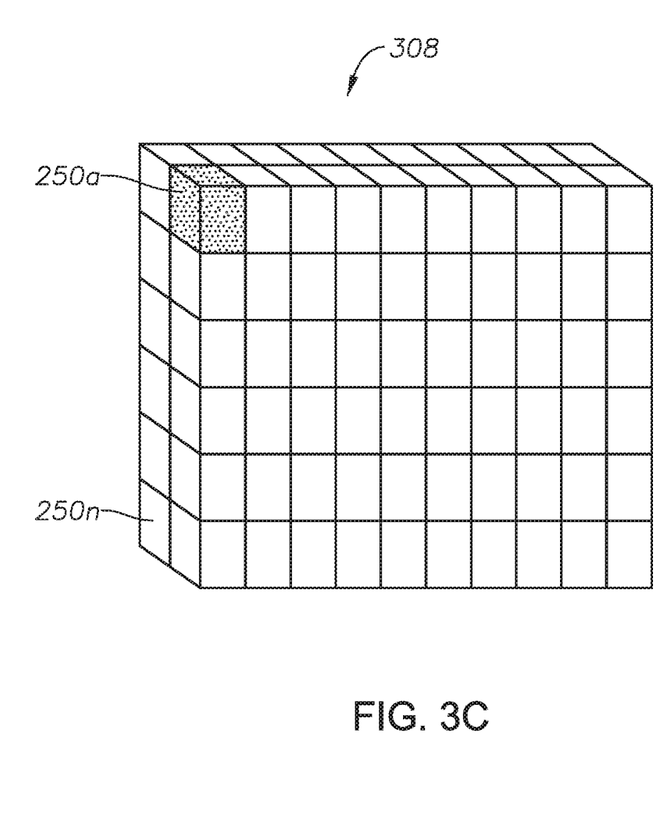

FIG. 2E shows a larger bricked dataset 252 made up of a plurality of bricks 250 applying user-defined optimal direction of inline, crossline or Z axis directions. In both FIGS. 2C and 2E, each brick contains data for a user-specified number of crosslines, inlines and time or depth samples (along Z-axis). At block 206, the system defines the set of sequential traces as collection of many traces and/or bricks that can be best consumed by the desired seismic operation, as further discussed below. FIGS. 3A-3C illustrate a variety of ways in which the set of sequential traces may be defined from bricked dataset 252. In this example, dataset 252 may include 500 GB of data. FIG. 3A illustrates a pillar 304 that is a collection of bricks 250a-n along the Z axis which, in this example, may include 4 Mb of 256 traces data. FIG. 3C illustrates a tile 306, which is a collection of pillars. Tile 306 may include any number of bricks totaling 16 Mb, each having, for example, 1024 traces.

FIG. 3D is a slap 308, which is a collection of tiles (e.g., 100 tiles) totaling, for example, 1 GB of data. In one example, bricked dataset 252 may define the input dataset, with pillar 304, tile 306 or slap 308 defining the set of sequential traces based on, for example, local memory capacity and the selected operation data access requirement.

Figure 2F:
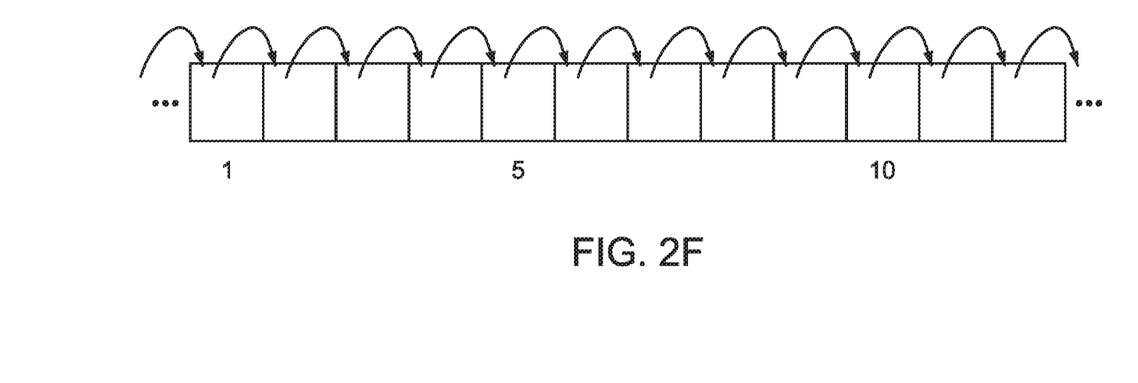
FIG. 2F shows the bricks from the bricked data set of FIG. 2E being sequentially stored on a storage device, according to certain illustrative embodiments of the present disclosure.

In certain examples, a pillar and tile are the optimal sets of sequential traces for interpretation operations, such as horizon auto-tracking. In other examples, a slap set of sequential traces is optimal for the computation operations, such as amplitude extraction and attribute generation. Therefore, referring to FIG. 2E, in order to read/write bricks 1-10 in a sequential fashion, seismic modeling system 100 reads the trace data of bricks 250a-n from storage medium 110A,B, then sequentially reads the dataset into local memory, as described above and shown in FIG. 2F.

To determine the optimal direction, the seismic modeling system reads from the dataset volume header which includes the defined optimal direction for sequentially storing the bricks. In FIGS. 2C and 2E, the optimal direction was assumed to be in the inline direction. However, in other applications, the optimal direction may be along the crossline direction or Z-axis direction. This feature of the present disclosure whereby the defined set of traces are read sequentially in the optimal direction improves the speed of the retrieving data because the systems avoids randomly reading/writing the data, which leads to underutilization of storage medium speed.

With reference back to method 200, once the set of sequential traces required by the operation has been defined in block 206, processor 102 then determines if the defined set of sequential traces is positioned outside a previously defined set. Thus, processor 102 will ensure there are no time-consuming duplicate reads, or re-fetching of data, from storage medium 110A or 110B at block 208. To determine this, system maintains a state map of the loaded data in tiles or slaps, for example, to keep track if the requested tile or slap is already available in local memory. If the determination is "No," this means the defined set has already been written to local memory 104. Thus, at block 212, processor 102 performs the selected operation (block 204) on the defined set of sequential traces in local memory 104 to thereby generate an output dataset reflecting one or more seismic-petrophysical properties at block 214. Illustrative operations include, for example, an amplitude, phase, frequency, structure of the input dataset, such as amplitude extraction or autotracking, or visualization of the data, as will be understood by those ordinarily skilled in the art having the benefit of this disclosure. As an example, seismic attribute calculations transform seismic data of one property and generate a seismic volume of a different property. These volumes can enhance interpretation of subsurface features thus giving a better overall understanding of the subsurface. The output dataset may comprise, for example, volume datasets or horizon datasets.

The type of operation being executed determines the input and output data types. For example, an amplitude extraction process requires an input seismic volume and an input structure horizon. The output is an amplitude horizon. Moreover, in certain illustrative embodiments, the output dataset may be an input dataset for further operations or may be a visualization of the output dataset.

If, however, at block 208, processor 102 determines the defined set of sequential traces is outside a previously fetched set, this means the system must fetch the new second set of sequential trace data from storage medium 110A or 110B at block 210. Thus, processor 102 then reads all the traces in the defined set trace-by-trace and brick by brick, in a sequential fashion for optimal speed. After the data has been fetched, it is then stored in local memory 104. Thereafter, the selected operation is performed on the set of sequential trace data in local memory 104, and the data may be used for further analysis or may be visualized in block 214 (as shown in FIG. 2B, for example).

At block 216, processor 102 then determines if all the traces in the area of interest (the union between input horizon and input seismic in blocks 202A,B) have been processed. If the determination is "No," the method then loops back to block 208, where the defined set of sequential traces is again analyzed to determine if they lie inside or outside any previously fetched set, and the process described above is repeated. Since method 200 only fetches "chunks," or sets, of trace data from storage medium 110A,B, the number of fetching loops is greatly reduced in comparison to conventional approaches which continuously loop to fetch the data trace-by-trace. Nevertheless, if at block 216, the determination is "Yes," the processor saves the output at block 218, which may be used for visualization and/or further analysis.

Figure 4:
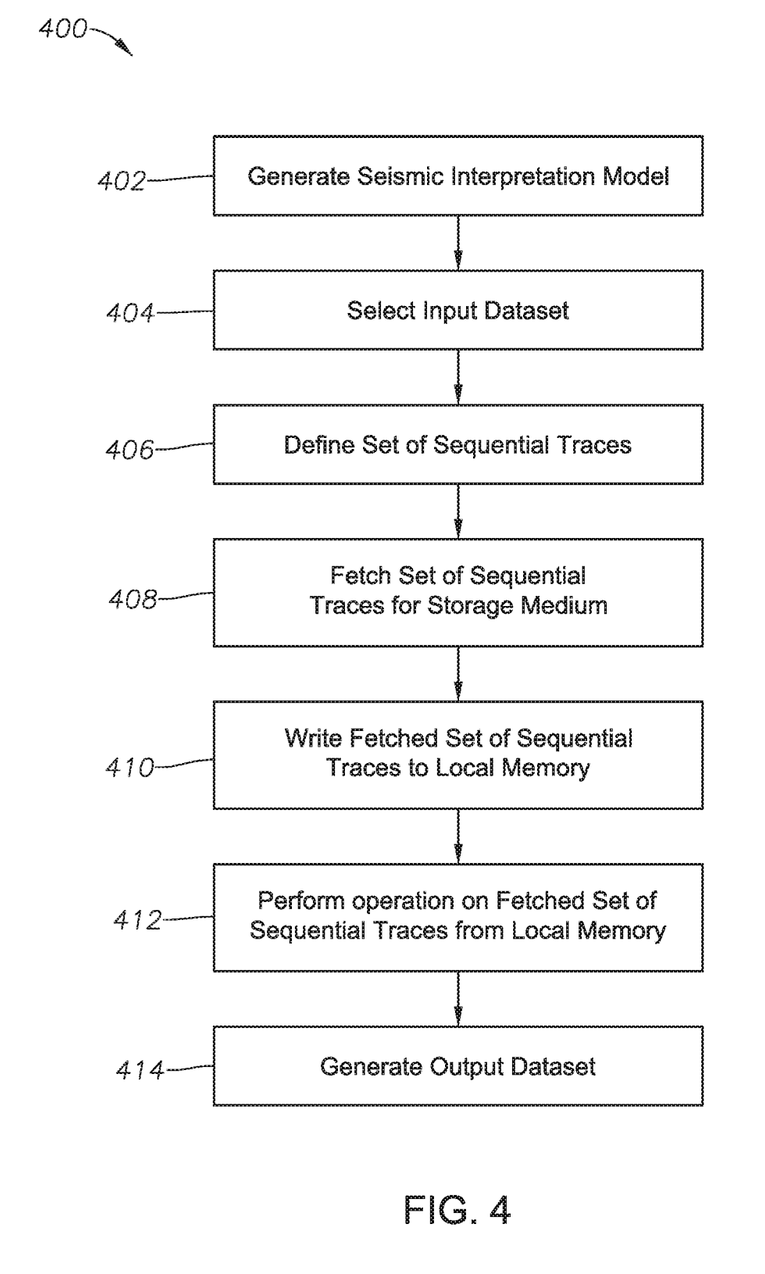
FIG. 4 is a flow chart of a generalized method for analyzing seismic data, according to certain illustrative methods of the present disclosure.

In view of the foregoing, FIG. 4 is a generalized flow chart of a method 400 for analyzing seismic data, according to certain illustrative methods of the present disclosure. In block 402, a seismic interpretation model is generated which contains seismic and horizon data formed by a plurality of trace data. At block 404, an input dataset is selected from the seismic and horizon data, along with an operation to be performed in the input dataset. At block 406, a set of sequential traces within the input data set is defined as necessary for the selected operation, as described above. At block 408, the defined set of sequential trace data is fetched from the storage medium in a sequential fashion in the optimal direction, and then written to the local memory in like-manner at block 410. At block 412, the selected operation is performed on the set of sequential trace data from the local memory, whereby an output dataset is generated at block 414. Moreover, before re-fetching more sets of sequential trace data from the storage medium, the system will first determine if the next set has already been fetched. As a result, the system avoids sluggishness caused by unnecessarily re-fetching data from the storage medium and re-saving it to the local memory.

Ultimately, the output dataset may be used for a variety of purposes. Such uses include, for example, visualization of the seismic data. Alternatively, the output dataset may be used as an input for further modeling operations. In yet other applications, the output dataset may be used to plan a wellbore operation, perform or update a wellbore operation in real-time or to analyze a wellbore operation which has already occurred. In addition, wellbore equipment may be identified and prepared based upon the planned wellbore operation, and the wellbore is then drilled, stimulated, altered and/or completed in accordance to the wellbore plan. These and other applications will be readily understood by those ordinarily skilled in the art having the benefit of this disclosure.

Accordingly, the illustrative methods described herein provide on-demand fetching of sequential sets of seismic data to local memory from slower storage mediums prior to performing modeling operations, such as, for example, horizon auto-tracking and amplitude extraction. This maximizes performance of the storage infrastructure (e.g., hard drives, filer over network, etc.) and utilizes local memory speed to deliver the optimal performance of very large seismic datasets (e.g., 2D lines of >2 Gb, 3D volumes of >1 Tb) which may be 100s greater than the local memory capacity. As a result, the described systems improve the efficiency of seismic interpretation and computation.

Embodiments and methods of the present disclosure described herein further relate to any one or more of the following paragraphs:

1. A computer-implemented method to analyze seismic data, the method comprising generating a seismic interpretation model of a hydrocarbon reservoir, the seismic interpretation model comprising seismic and horizon data formed by a plurality of traces; selecting an input dataset from the seismic and horizon data, and an operation to be performed thereon; defining a set of sequential traces required by the operation within the input dataset; fetching the set of sequential traces from a storage medium; writing the fetched set of sequential traces to local memory; performing the operation on the set of sequential traces in the local memory; and generating an output dataset based upon the performed operation.

2. A computer-implemented method as defined in paragraph 1, wherein fetching the set of sequential traces comprises determining if the set of sequential traces is positioned outside a previously fetched set of sequential traces; and if the set of sequential traces is positioned outside the previously fetched set of sequential traces, fetching the set of sequential traces from the storage medium; or if the set of sequential traces is positioned inside the previously fetched set of sequential traces, performing an operation on the set of sequential traces without re-fetching the set of sequential traces from the storage medium.

3. A computer-implemented method as defined in paragraphs 1 or 2, further comprising determining if the operation has been performed on all traces in the input dataset; if the operation has not been performed on all traces in the input dataset, fetching a second set of sequential traces from the storage medium; writing the fetched second set of sequential traces to the local memory; performing the operation on the second set of sequential traces in the local memory; and generating another output dataset based upon the performed operation.

4. A computer-implemented method as defined in any of paragraphs 1-3, wherein fetching the set of sequential traces comprises reading traces from the storage medium in an optimal direction as defined in a dataset volume header.

5. A computer-implemented method as defined in any of paragraphs 1-4, wherein writing the fetched set of sequential traces comprising writing the fetched set of sequential traces to random-access memory.

6. A computer-implemented method as defined in any of paragraphs 1-5, wherein writing the fetched set of sequential traces comprising writing the fetched set of sequential traces to a cache.

7. A computer-implemented method as defined in any of paragraphs 1-6, wherein performing the operation comprises performing an amplitude extraction, autotracking operation or seismic attribute generation on the set of sequential traces.

8. A computer-implemented method as defined in any of paragraphs 1-7, wherein the output dataset is utilized to plan, perform or analyze a wellbore operation.

9. A computer-implemented method as defined in any of paragraphs 1-8, further comprising visualizing the output dataset; or using the output dataset to perform further operations.

10. A system to analyze seismic data, the system comprising processing circuitry to implement any of the methods in paragraphs 1-9; a local memory communicably coupled to the processing circuitry; and a storage medium communicably coupled to the processing circuitry.

11. A system as defined in paragraph 10, wherein the local memory is a random-access memory.

12. A system as defined in paragraph 10, wherein the local memory is a cache.

13. A system as defined in paragraph 10, wherein the storage medium is a hard disk, network storage device, CD-RW, DVD-RW, or filer.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to analyze seismic data, the method comprising:
    generating a seismic interpretation model of a hydrocarbon reservoir, the seismic interpretation model comprising seismic data defined by cartographic coordinates which form a plurality of traces, the traces being sets of seismic data positioned side-by-side in a defined cartographic direction;
    selecting an input dataset from the seismic data, and an operation to be performed thereon;
    defining a set of sequential traces required by the operation within the input dataset, the sequential traces being sets of traces positioned side-by-side in a defined cartographic direction;
    fetching the set of sequential traces from a storage medium based upon a determination of whether the set of sequential traces is positioned outside a previously fetched set of sequential traces;
    writing the fetched set of sequential traces to local memory;
    performing the operation on the set of sequential traces in the local memory; and
    generating an output dataset based upon the performed operation.

2. A computer-implemented method as defined in claim 1, wherein fetching the set of sequential traces further comprises:
    if the set of sequential traces is positioned outside the previously fetched set of sequential traces, fetching the set of sequential traces from the storage medium; or
    if the set of sequential traces is positioned inside the previously fetched set of sequential traces, performing an operation on the set of sequential traces without re-fetching the set of sequential traces from the storage medium.

3. A computer-implemented method as defined in claim 1, further comprising:
    determining if the operation has been performed on all traces in the input dataset;
    if the operation has not been performed on all traces in the input dataset, fetching a second set of sequential traces from the storage medium;
    writing the fetched second set of sequential traces to the local memory;
    performing the operation on the second set of sequential traces in the local memory; and
    generating another output dataset based upon the performed operation.

4. A computer-implemented method as defined in claim 1, wherein fetching the set of sequential traces comprises reading traces from the storage medium in an optimal cartographic direction as defined in a dataset volume header.

5. A computer-implemented method as defined in claim 1, wherein writing the fetched set of sequential traces comprising writing the fetched set of sequential traces to random-access memory.

6. A computer-implemented method as defined in claim 1, wherein writing the fetched set of sequential traces comprising writing the fetched set of sequential traces to a cache.

7. A computer-implemented method as defined in claim 1, wherein performing the operation comprises performing an amplitude extraction, autotracking operation or seismic attribute generation on the set of sequential traces.

8. A computer-implemented method as defined in claim 1, wherein the output dataset is utilized to plan, perform or analyze a wellbore operation.

9. A computer-implemented method as defined in claim 1, further comprising:
    visualizing the output dataset; or
    using the output dataset to perform further operations.

10. A system to analyze seismic data, the system comprising:
    processing circuitry to implement the method in claim 1;
    a local memory communicably coupled to the processing circuitry; and
    a storage medium communicably coupled to the processing circuitry.

11. A system as defined in claim 10, wherein the local memory is a random-access memory.

12. A system as defined in claim 10, wherein the local memory is a cache.

13. A system as defined in claim 10, wherein the storage medium is a hard disk, network storage device, CD-RW, DVD-RW, or filer.

14. A non-transitory computer readable medium comprising instructions which, when executed by at least one processor, causes the processor to perform the method comprising:
    generating a seismic interpretation model of a hydrocarbon reservoir, the seismic interpretation model comprising seismic data defined by cartographic coordinates which form a plurality of traces, the traces being sets of seismic data positioned side-by-side in a defined cartographic direction;
    selecting an input dataset from the seismic data, and an operation to be performed thereon;
    defining a set of sequential traces required by the operation within the input dataset, the sequential traces being sets of traces positioned side-by-side in a defined cartographic direction;
    fetching the set of sequential traces from a storage medium based upon a determination whether the set of sequential traces is positioned outside a previously fetched set of sequential traces;
    writing the fetched set of sequential traces to local memory;
    performing the operation on the set of sequential traces in the local memory; and
    generating an output dataset based upon the performed operation.

15. The computer readable medium of claim 14, wherein fetching the set of sequential traces further comprises:
- if the set of sequential traces is positioned outside the previously fetched set of sequential traces, fetching the set of sequential traces from the storage medium; or
- if the set of sequential traces is positioned inside the previously fetched set of sequential traces, performing an operation on the set of sequential traces without re-fetching the set of sequential traces from the storage medium.

16. The computer readable medium of claim 14, wherein the method further comprises:
- determining if the operation has been performed on all traces in the input dataset;
- if the operation has not been performed on all traces in the input dataset, fetching a second set of sequential traces from the storage medium;
- writing the fetched second set of sequential traces to the local memory;
- performing the operation on the second set of sequential traces in the local memory; and
- generating another output dataset based upon the performed operation.

17. The computer readable medium of claim 14, wherein fetching the set of sequential traces comprises reading traces from the storage medium in an optimal cartographic direction as defined in a dataset volume header.

18. The computer readable medium of claim 14, wherein writing the fetched set of sequential traces comprises writing the fetched set of sequential traces to random-access memory.

19. The computer readable medium of claim 14, wherein writing the fetched set of sequential traces comprises writing the fetched set of sequential traces to a cache.

20. The computer readable medium of claim 14, wherein performing the operation comprises performing an amplitude extraction, autotracking operation or seismic attribute generation on the set of sequential traces.

* * * * *